(12) United States Patent
Liu et al.

(10) Patent No.: US 12,075,435 B2
(45) Date of Patent: Aug. 27, 2024

(54) COMMUNICATION METHOD AND APPARATUS

(71) Applicant: HUAWEI TECHNOLOGIES CO., LTD., Shenzhen (CN)

(72) Inventors: Zhe Liu, Shanghai (CN); Jinlin Peng, Shanghai (CN); Pengpeng Dong, Shanghai (CN); Hao Tang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 353 days.

(21) Appl. No.: 17/505,907

(22) Filed: Oct. 20, 2021

(65) Prior Publication Data

US 2022/0039075 A1    Feb. 3, 2022

Related U.S. Application Data

(63) Continuation of application No. PCT/CN2020/087890, filed on Apr. 29, 2020.

(30) Foreign Application Priority Data

Apr. 29, 2019  (CN) .......................... 201910356746.9

(51) Int. Cl.
*H04L 1/1867*    (2023.01)
*H04L 5/00*    (2006.01)
(Continued)

(52) U.S. Cl.
CPC .......... *H04W 72/23* (2023.01); *H04W 72/044* (2013.01)

(58) Field of Classification Search
CPC ... H04W 72/23; H04W 72/044; H04W 72/53; H04W 72/52; H04W 72/0453
See application file for complete search history.

(56) References Cited

U.S. PATENT DOCUMENTS 10,813,137 B2 * 10/2020 Shih ..................... H04W 72/23
11,064,434 B2 *  7/2021 Lin .................... H04W 52/0225
(Continued)

FOREIGN PATENT DOCUMENTS

CN    108352974 A    7/2018
CN    108882376    * 11/2018 ........... H04L 5/0053
(Continued)

OTHER PUBLICATIONS

3GPP TSG-RAN WG3 Meeting#112e, R3-212824 Title: LS on Area scope configuration and frequency band info in MDT configuration (Year: 2021).*

(Continued)

*Primary Examiner* — Faruk Hamza
*Assistant Examiner* — Abusayeed M Haque
(74) *Attorney, Agent, or Firm* — Rimon PC

(57) ABSTRACT

This application discloses a communication method that includes: receiving first control information of a first bandwidth part (BWP) and second control information of a second BWP, and receiving a first data channel and a second data channel based on the first control information. The first BWP includes a first frequency domain resource and a second frequency domain resource. The second BWP includes a third frequency domain resource, and the third frequency domain resource and the second frequency domain resource overlap. The first data channel is located on the first frequency domain resource, and the second data channel is located on the third frequency domain resource. The foregoing method provides a manner of transmitting data on the first and second BWPs that partially overlap.

16 Claims, 8 Drawing Sheets

(51) Int. Cl.
*H04W 72/23* (2023.01)
*H04W 72/044* (2023.01)

(56) References Cited

U.S. PATENT DOCUMENTS

| | | | | |
|---|---|---|---|---|
| 11,701,734 | B2 * | 7/2023 | Raymond | ............ H05H 1/3489 |
| | | | | 219/121.39 |
| 2019/0045533 | A1 | 2/2019 | Chatterjee et al. | |
| 2019/0082431 | A1 | 3/2019 | Yi et al. | |
| 2019/0246395 | A1 * | 8/2019 | Huang | ................. H04W 72/12 |
| 2019/0254056 | A1 * | 8/2019 | Salah | ................ H04W 72/1263 |
| 2019/0313437 | A1 * | 10/2019 | Jung | .................... H04L 5/0042 |

FOREIGN PATENT DOCUMENTS

| | | | | | |
|---|---|---|---|---|---|
| CN | 108882376 | A | | 11/2018 | |
| CN | 109152019 | A | | 1/2019 | |
| CN | 109600835 | | * | 4/2019 | ........... H04L 5/0046 |
| CN | 109600835 | A | | 4/2019 | |
| CN | 109600844 | A | | 4/2019 | |
| WO | WO-2018231971 | A1 | * | 12/2018 | ........... H04L 1/1812 |
| WO | 2019009665 | A1 | | 1/2019 | |
| WO | 2019051242 | A2 | | 3/2019 | |
| WO | WO-2019143985 | A1 | * | 7/2019 | ........... H04L 1/1819 |

OTHER PUBLICATIONS

3GPP TSG RAN WG1 Meeting #96bis,R1-1903932,NRU wideband BWP operation,Huawei, HiSilicon,Xi an, China, Apr. 8-12, 2019,total 9 pages.

3GPP TSG-RAN WG1 #96bis,R1-1904681,Discussion on BWP switching and LBT,Google Inc.,Xi an, China, Apr. 8-12, 2019,total 2 pages.

3GPP TSG-RAN WG1 Meeting #90,R1-1714094,On the remaining wider-band aspects of NR ,Nokia, Nokia Shanghai Bell,Prague, Czech Republic, Aug. 21-25, 2017,,total 6 pages.

* cited by examiner

COMMUNICATION METHOD AND APPARATUS

CROSS-REFERENCE TO RELATED APPLICATIONS

This application is a continuation of International Application No. PCT/CN2020/087890, filed on Apr. 29, 2020, which claims priority to Chinese Patent Application No. 201910356746.9, filed on Apr. 29, 2019. The disclosures of the aforementioned applications are hereby incorporated by reference in their entireties.

TECHNICAL FIELD

This application relates to the field of communication technologies, and in particular, to a communication method and apparatus.

BACKGROUND

In a wireless communication system, a terminal device and a network device perform wireless communication based on a radio communication technology. In a 5G new radio (NR) communication system under discussion, a maximum bandwidth of one carrier may reach 400 MHz, but a maximum bandwidth capability supported by a terminal device may not reach such a large bandwidth. When the terminal device does not support a bandwidth capability of one carrier, a base station cannot directly allocate a frequency domain resource to the terminal device within a carrier bandwidth range like a long term evolution (LTE) system, but needs to first configure one or more bandwidth parts (BWPs) for the terminal device on the carrier, and then allocate a resource to the terminal device within the BWP range.

In NR, the network device may configure a plurality of BWPs for the terminal device. Further, the network device may activate one of the BWPs for the terminal device, or may activate two or more of the BWPs for the terminal device. Then, the network device communicates with the terminal device on the active BWP.

However, when the network device activates a plurality of BWPs for the terminal device, how the network device communicates with the terminal device on the plurality of active BWPs still needs to be further studied.

SUMMARY

In view of this, this application provides a communication method and an apparatus, to increase a data transmission success rate.

According to a first aspect, an embodiment of this application provides a communication method. The method includes:

receiving first control information of a first BWP from a network device, where the first control information is used to indicate a first data channel and a second data channel; and receiving, from the network device based on the first control information, first data carried on the first data channel and second data carried on the second data channel. The first BWP includes a first frequency domain resource and a second frequency domain resource, a second BWP includes a third frequency domain resource, and the third frequency domain resource and the second frequency domain resource overlap in frequency domain. In some embodiments, the third frequency domain resource and the second frequency domain resource overlaps completely. The first data channel is located on the first frequency domain resource, and the second data channel is located on the third frequency domain resource.

The foregoing method provides a manner of transmitting a data channel on the first BWP and the second BWP when the first BWP and the second BWP that are activated partially overlap. In other words, when data needs to be transmitted on the first BWP, a part of the data may be carried on the first BWP (for example, the first frequency domain resource), and the other part of the data may be carried on the second BWP (for example, the third frequency domain resource). This can improve resource utilization efficiency, and can effectively increase a data transmission success rate.

In a possible design, the first data includes a first redundancy version obtained based on the to-be-transmitted data, and the second data includes a second redundancy version obtained based on the to-be-transmitted data.

In a possible design, the method further includes: processing the first data, and if the processing fails, processing the first data and the second data.

In this manner, because the to-be-transmitted data can be sent through different BWPs, when a redundancy version on a BWP fails to be parsed, the redundancy version on the BWP and a redundancy version on another BWP can be parsed together or jointly parsed. Therefore, a data transmission success rate can be effectively increased.

In a possible design, the method further includes: receiving second control information of the second BWP from the network device, where the second control information is used to indicate a third data channel; and receiving, from the network device based on the second control information, third data carried on the third data channel, where the third data channel is located on the third frequency domain resource, and a position of the third data channel does not overlap a position of the second data channel.

According to the foregoing method, because the position of the third data channel does not overlap the position of the second data channel, resource utilization can be improved without affecting normal transmission of the third data channel.

In a possible design, the method further includes: receiving indication information from the network device, where the indication information is used to indicate that a candidate time-frequency position of the first control information is the same as a candidate time-frequency position of the second control information of the second BWP; and receiving the first control information and the second control information at the candidate time-frequency position of the first control information.

According to the foregoing method, because the candidate time-frequency positions of the first control information and the second control information are the same, the first control information and the second control information can be detected at the candidate time-frequency position of the first control information. That is, the first control information and the second control information can be detected without increasing blind detection power consumption of the first control information.

In a possible design, the method further includes: receiving a configuration parameter of a search space of the first BWP from the network device, and determining the candidate time-frequency position of the first control information based on the configuration parameter of the search space of the first BWP.

In a possible design, a payload size of the first control information is equal to a payload size of the second control information.

According to a second aspect, an embodiment of this application provides a communication method. The method includes:

sending first control information of a first BWP to a terminal device, where the first control information is used to indicate a first data channel and a second data channel; and sending first data carried on the first data channel and second data carried on the second data channel to the terminal device, where the first BWP includes a first frequency domain resource and a second frequency domain resource, a second BWP includes a third frequency domain resource, and the third frequency domain resource overlaps the second frequency domain resource in frequency domain; and the first data channel is located on the first frequency domain resource, and the second data channel is located on the third frequency domain resource. In some embodiments, the third frequency domain resource completely overlaps the second frequency domain resource in frequency domain.

In a possible design, the first data includes a first redundancy version obtained based on to-be-transmitted data, and the second data includes a second redundancy version obtained based on the to-be-transmitted data.

In a possible design, the method further includes: sending second control information of the second BWP to the terminal device, where the second control information is used to indicate a third data channel. The third data channel is located on the third frequency domain resource, and a position of the third data channel does not overlap a position of the second data channel.

In a possible design, the method further includes: sending indication information to the terminal device, where the indication information is used to indicate that a candidate time-frequency position of the first control information is the same as a candidate time-frequency position of the second control information of the second BWP; and sending the first control information and/or the second control information at the candidate time-frequency position of the first control information.

In a possible design, the method further includes: sending a configuration parameter of a search space of the first BWP to the terminal device.

In a possible design, a payload size of the first control information is equal to a payload size of the second control information.

According to a third aspect, an embodiment of this application provides a communication method. The method includes:

receiving indication information from a network device, where the indication information is used to indicate that a candidate time-frequency position of first control information of a first BWP is the same as a candidate time-frequency position of second control information of a second BWP; and detecting the first control information and the second control information at the candidate time-frequency position of the first control information.

In a possible design, the method further includes: receiving, by the terminal device, a configuration parameter of a search space of the first BWP from the network device, and determining the candidate time-frequency position of the first control information based on the configuration parameter of the search space of the first BWP.

In a possible design, a payload size of the first control information is equal to a payload size of the second control information.

According to a fourth aspect, an embodiment of this application provides a communication method, where the method includes: sending indication information to a terminal device, where the indication information is used to indicate that a candidate time-frequency position of first control information of a first BWP is the same as a candidate time-frequency position of second control information of a second BWP; and sending the first control information and/or the second control information to the terminal device at the candidate time-frequency position of the first control information.

In a possible design, the method further includes: sending a configuration parameter of a search space of the first BWP to the terminal device, where the configuration parameter of the search space of the first BWP is used to determine the candidate time-frequency position of the first control information.

In a possible design, a payload size of the first control information is equal to a payload size of the second control information.

According to a fifth aspect, an embodiment of this application provides an apparatus. The apparatus may be a terminal device or a network device, or may be a chip disposed in the terminal device or the network device. The apparatus has a function of implementing various possible implementations of the first aspect to the fourth aspect. The function may be implemented by hardware, or may be implemented by hardware executing corresponding software. The hardware or the software includes one or more units or modules corresponding to the foregoing function.

According to a sixth aspect, an embodiment of this application provides an apparatus, including a processor and a memory, where the processor is configured to execute instructions stored in the memory, and when the instructions are executed, the apparatus is enabled to perform the method according to any one of the possible designs of the first aspect or the third aspect.

According to a seventh aspect, an embodiment of this application provides a terminal device, including the apparatus according to the sixth aspect.

According to an eighth aspect, an embodiment of this application provides an apparatus, including a processor and a memory, where the processor is configured to execute instructions stored in the memory, and when the instructions are executed, the apparatus is enabled to perform the method according to any one of the possible designs of the second aspect or the fourth aspect.

According to a ninth aspect, an embodiment of this application provides a network device, including the apparatus according to the eighth aspect.

According to a tenth aspect, an embodiment of this application provides a communication system, including the terminal device according to the seventh aspect and the network device according to the ninth aspect.

According to an eleventh aspect, an embodiment of this application further provides a computer-readable storage medium, including instructions. When the instructions are executed, the method according to any one of the foregoing aspects or the possible designs of the foregoing aspects is implemented.

According to a twelfth aspect, an embodiment of this application further provides a computer program product, including a computer program or instructions. When the computer program or the instructions is/are executed, the method according to any one of the foregoing aspects or the possible designs of the foregoing aspects is implemented.

DESCRIPTION OF EMBODIMENTS

Figure 1A:
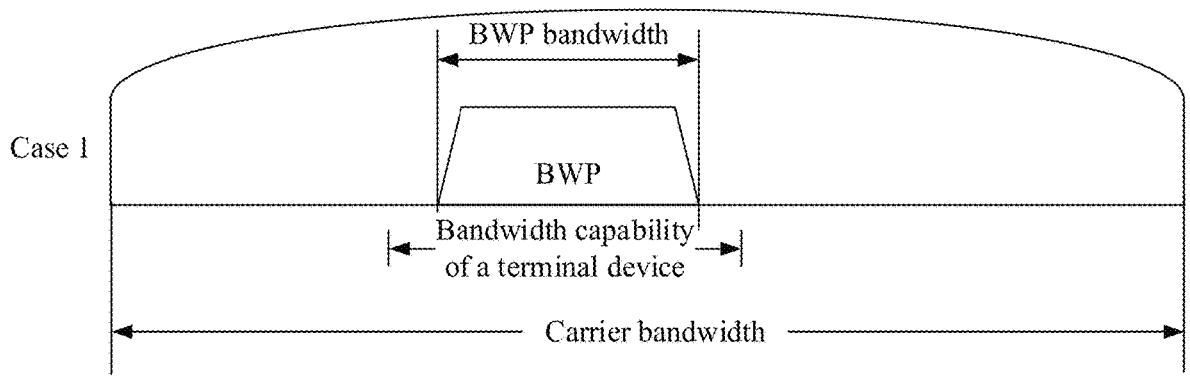
FIG. 1a, FIG. 1b, and FIG. 1c are schematic diagrams of BWP configurations in a carrier bandwidth according to an embodiment of this application.

To make the objectives, technical solutions, and advantages of this application clearer, the following further describes this application in detail with reference to the accompanying drawings.

The following describes some terms in the embodiments of the present invention, to help a person skilled in the art have a better understanding.

(1) Terminal device: The terminal device is a device having a wireless transceiver function, and may be deployed on land, where the deployment includes indoor or outdoor, handheld, wearable, or in-vehicle deployment; may be deployed on water (for example, on a ship); or may be deployed in air (for example, on an airplane, a balloon, and a satellite). The terminal device may be a mobile phone, a tablet computer, a computer having a wireless transceiver function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in the embodiments of this application. The terminal device may sometimes be referred to as user equipment (UE), an access terminal device, a UE unit, a UE station, a mobile station, a mobile console, a remote station, a remote terminal device, a mobile device, a UE terminal device, a terminal device, a wireless communication device, a UE agent, a UE apparatus, or the like.

(2) Network device: The network device, for example, including a base station (for example, an access point), may be a device that is in an access network and that communicates with a wireless mobile device over an air interface through one or more cells. The base station may be configured to mutually convert a received over-the-air frame and a received internet protocol (IP) packet, and serve as a router between the mobile device and the other parts of the access network, where the other parts of the access network may include an IP network. The base station may further coordinate attribute management of the air interface. For example, the base station may include a next generation NodeB (gNB) in a 5G NR system. Alternatively, the base station may include an evolved NodeB (NodeB, eNB, or e-NodeB) in an LTE system or an LTE-advanced (LTE-Advanced, LTE-A) system. This is not limited in the embodiments of the present invention.

(3) Downlink control channel: The downlink control channel is used to carry control information. A specific channel included in the downlink control channel is not limited in the embodiments of this application. For example, the downlink control channel includes a PDCCH or an enhanced physical downlink control channel (enhanced physical downlink control channel, EPDCCH), and may further include another downlink control channel used to transmit control information. The following mainly uses an example in which the downlink control channel is a PDCCH for description.

(4) BWP: In a 5G NR system, to adapt to a bandwidth capability of a terminal device, a BWP may be configured for the terminal device within a bandwidth supported by one carrier (which may be referred to as a carrier bandwidth, and a specific value may be 10 MHz, 15 MHz, 20 MHz, 50 MHz, 100 MHz, 400 MHz, or the like). A plurality of BWPs may be configured on one carrier. For example, four BWPs may be configured on one carrier. The BWP may also be sometimes referred to as a carrier bandwidth part, a subband bandwidth, a narrowband bandwidth, or another name. The name is not limited in this application. For ease of description, an example in which the name is the BWP is used for description. For example, one BWP includes K (K>0) subcarriers. Alternatively, one BWP is a frequency domain resource on which N non-overlapping RBs are located, and a subcarrier spacing of the RB may be 15 kHz, 30 kHz, 60 kHz, 120 kHz, 240 kHz, 480 kHz, or another value. Alternatively, one BWP is a frequency domain resource on which M non-overlapping resource block groups (RBG) are located. For example, one RBG includes P (P>0) consecutive RBs, and a subcarrier spacing (SCS) of the RB may be 15 kHz, 30 kHz, 60 kHz, 120 kHz, 240 kHz. 480 kHz, or another value, for example, an integer multiple of 2.

Figure 1B:
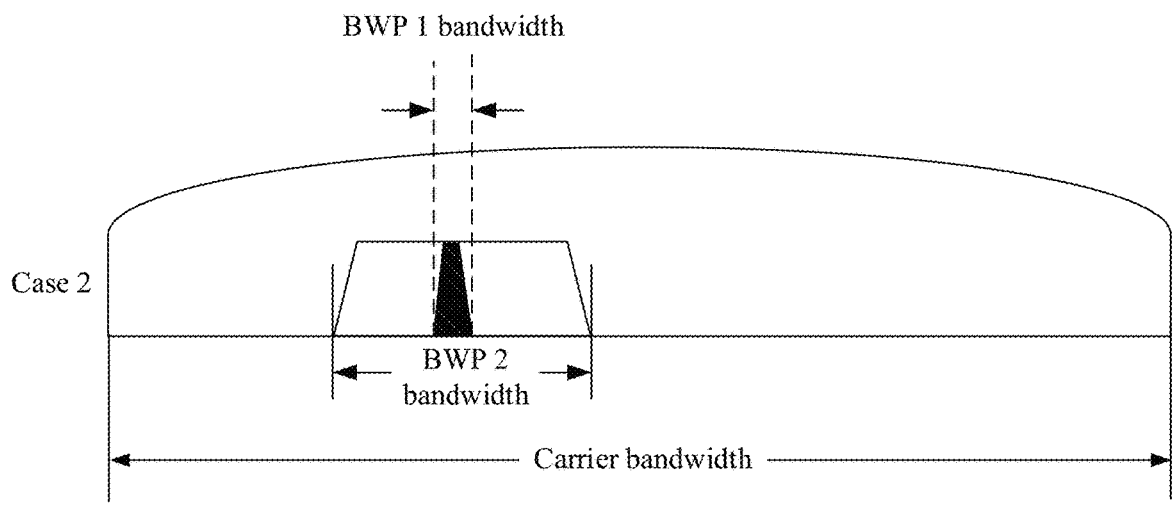
Figure 1C:
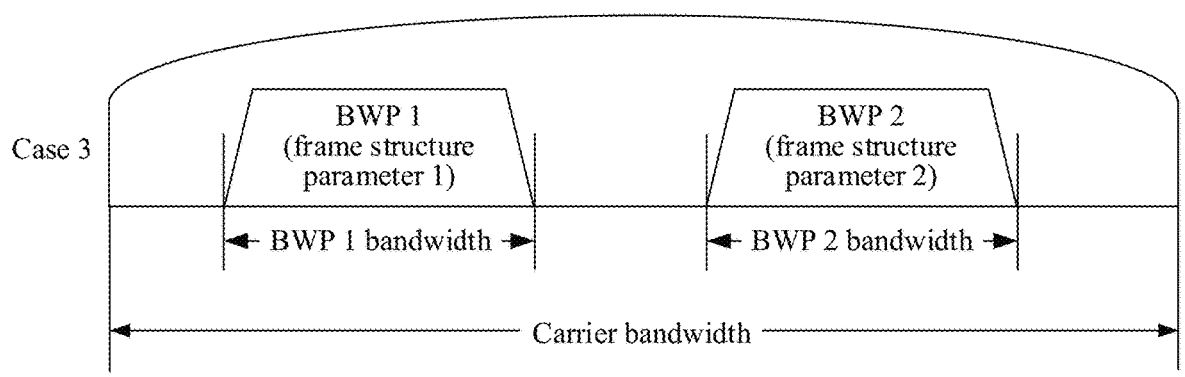

FIG. 1a to FIG. 1c show three BWP configurations in a carrier bandwidth according to an embodiment of this application. FIG. 1a shows a case in which one BWP is configured in a carrier bandwidth. A network device may first allocate a BWP within a terminal bandwidth capability range to the terminal device, and certainly, may further allocate some or all resources in the BWP to the terminal device for communication. The network device may configure different BWPs for the terminal device based on actual scenarios. For example, to reduce power consumption of the terminal device, the network device may allocate a BWP to the terminal device based on a service volume of the terminal device. When the terminal device does not need to transmit service data or needs to transmit a small amount of service data, a relatively small BWP, such as a BWP 1 shown in FIG. 1b, may be allocated to the terminal device to receive control information and a small amount of data information. When the terminal device needs to transmit a large amount of service data, a relatively large BWP, such as a BWP 2 shown in FIG. 1b, may be allocated to the terminal device. For another example, because a plurality of service types and communication scenarios can be supported in 5G, different parameters can be configured for different service types and communication scenarios. The network device may allocate a corresponding BWP to the terminal device based on the different service types of the terminal device. As shown in FIG. 1c, one BWP may correspond to one service type. To meet a service requirement of the service type, a frame structure parameter (numerology) that can meet the service requirement may be configured for the BWP. It can be learned from FIG. 1b that different BWPs may occupy partially overlapping frequency domain resources. It can be learned from FIG. 1c that different BWPs may alternatively occupy different frequency domain resources and use different numerologies. In the embodiments of this application, numerologies corresponding to different BWPs may be the same or may be different. This is not limited in this application. It may be understood that in FIG. 1a to FIG. 1c, an example in which only one or two BWPs are configured on one carrier is used for description. During actual application, a plurality of BWPs may be configured on the carrier. This is not limited in this application.

(5) Frame structure parameter: The frame structure parameter is a parameter used by a communication system. For example, the frame structure parameter may be a series of physical layer parameters in an air interface. One BWP may correspond to one numerology. An NR system may support a plurality of numerologies, and the plurality of numerologies may be simultaneously used. The numerology may include one or more of the following parameter information: a subcarrier spacing, information about a cyclic prefix (CP), information about a time unit, a bandwidth, and the like. The information about the CP may include a CP length and/or a CP type. For example, the CP may be a normal CP (NCP) or an extended CP (ECP). The time unit is used to indicate a time element in time domain, and may be, for example, a sampling point, a symbol, a mini-slot (mini-slot), a slot (slot), a subframe (subframe), or a radio frame. The information about the time unit may include a type, a length, a structure, or the like of the time unit. For example, the numerology may include a subcarrier spacing and a CP. As shown in Table 1, Table 1 lists numerologies that can be currently supported in the NR system and that is defined by the subcarrier spacing and the CP.

TABLE 1

| $\mu$ | Subcarrier spacing = $2^{\mu} \cdot 15$ (kHz) | CP type |
|---|---|---|
| 0 | 15 | Normal (normal) |
| 1 | 30 | Normal |
| 2 | 60 | Normal or extended (extended) |
| 3 | 120 | Normal |
| 4 | 240 | Normal |

$\mu$ is used to determine the subcarrier spacing. For example, when $\mu$ = 0, the subcarrier spacing is 15 kHz, and when $\mu$ = 1, the subcarrier spacing is 30 kHz. The subcarrier spacing is used as an example. If a terminal supports subcarrier spacings of 15 kHz and 30 kHz, a network device may allocate a BWP with a subcarrier spacing of 15 kHz and a BWP with a subcarrier spacing of 30 kHz to the terminal. The terminal can switch to different BWPs for signal transmission based on different scenarios and service requirements. When the terminal supports a plurality of BWPs, numerologies corresponding to different BWPs may be the same or may be different.

The subcarrier spacing may be an integer greater than or equal to 0. For example, the subcarrier spacing may be 15 kHz, 30 kHz, 60 kHz, 120 kHz, 240 kHz, 480 kHz, or the like. The subcarrier spacing is a value of a spacing between central positions or peak positions of two adjacent subcarriers in frequency domain in an orthogonal frequency division multiplexing (OFDM) system. For example, a subcarrier spacing in an LTE system is 15 kHz, and a subcarrier spacing in the NR system may be 15 kHz, 30 kHz, 60 kHz, 120 kHz, or the like.

(6) Various numerals such as "first" and "second" in the embodiments of this application are merely used for differentiation for ease of description, and are not used to limit a scope of the embodiments of this application or represent a sequence. The term "and/or" describes an association relationship between associated objects and indicates that three relationships may exist. For example, A and/or B may indicate the following three cases: Only A exists, both A and B exist, and only B exists. The term "at least one" means one or more. The term "at least two" means two or more. The term "at least one", "any one", or a similar expression thereof means any combination of these items, including a single item (piece) or any combination of a plurality of items (pieces). For example, at least one (piece or type) of a, b, or c may indicate: a, b, c, a and b, a and c, b and c, or a, b, and c, where a, b, and c may be singular or plural.

Figure 2:
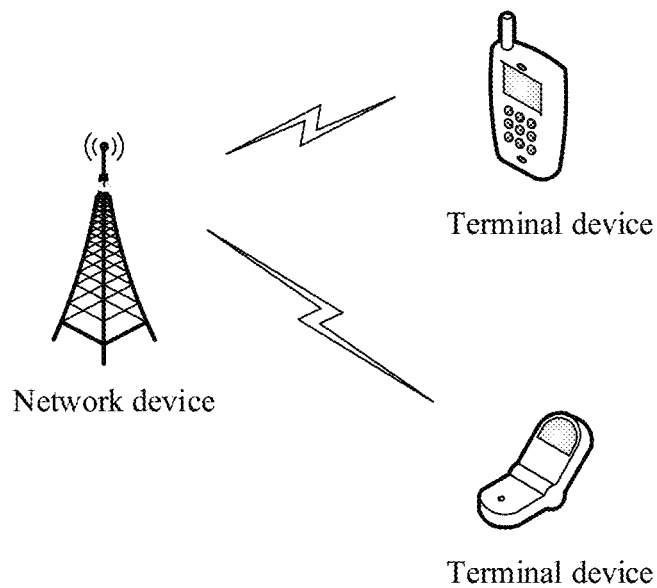
FIG. 2 is a schematic diagram of a system architecture to which an embodiment of this application is applicable.

FIG. 2 is a schematic diagram of a possible architecture of a communication system to which an embodiment of this application is applicable. The communication system shown in FIG. 2 includes a network device and a terminal device. It should be understood that FIG. 2 is merely a schematic diagram of an architecture of the communication system. A quantity of network devices and a quantity of terminal devices in the communication system are not limited in the embodiments of this application. In addition to the network device and the terminal device, the communication system to which the embodiments of this application are applicable may further include another device such as a core network device, a wireless relay device, and a wireless backhaul device. This is not limited in the embodiments of this application either. In addition, the network device in the embodiments of this application may integrate all functions into one independent physical device, or may distribute the functions on a plurality of independent physical devices. This is not limited in the embodiments of this application either. In addition, the terminal device in the embodiments of this application may be connected to the network device in a wireless manner.

A communication system to which the foregoing architecture is applicable may use various radio access technologies (RAT), for example, code division multiple access (CDMA), time division multiple access (TDMA), and frequency division multiple access (FDMA), orthogonal frequency division multiple access (OFDMA), single carrier frequency division multiple access (SC-FDMA), and the like. A RAT used in the communication system is not limited in this application. The terms "system" and "network" may be used interchangeably in this application. Networks may be classified into a 2G (generation) network, a 3G network, a 4G network, or a future evolved network such as a 5G network based on factors such as capacities, rates, or latencies of different networks or RATs used by the different networks. A typical 4G network includes a long-term evolution (LTE) network, and a typical 5G network includes a new radio access technology (NRAT) network.

The system architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that: With evolution of the communication system architecture and emergence of new service scenarios, the technical solutions provided in the embodiments of this application are also applicable to similar technical problems.

In the system architecture shown in FIG. 2, the network device and the terminal device may communicate by using an air interface resource, and the air interface resource may include a time domain resource and a frequency domain resource. For example, the network device may send the downlink control channel to the terminal device, where the downlink control channel includes the control information. The network device allocates a time-frequency resource of a data channel to the terminal by using the control information. The data channel may be, for example, a physical downlink shared channel (PDSCH) or a physical uplink shared channel (PUSCH). In this way, the network device and the terminal device perform data transmission on the allocated time-frequency resource through the data channel. In an example, the control information may indicate a time-frequency position of the data channel, for example, a symbol and/or a resource block (RB) to which the data channel is mapped, where the data transmission may include downlink data transmission and/or uplink data transmission. The downlink data (for example, data carried on the PDSCH) transmission may be that the network device sends the data to the terminal device, and the uplink data (for example, data carried on the PUSCH) transmission may be that the terminal device sends the data to the network device. The data may be data in a broad sense, for example, may be user data, or may be system information, broadcast information, or other information.

That is, that the network device may communicate with the terminal device by using the air interface resource may include: (1) sending, by the network device, the data channel to the terminal device, or sending, by the terminal device, the data channel to the network device, and (2) sending, by the network device, the downlink control channel to the terminal device. The following mainly describes the two aspects based on Embodiment 1 and Embodiment 2.

Embodiment 1

A network device may configure a plurality of BWPs for a terminal device, and one configured BWP may correspond to one numerology. The network device may simultaneously configure a plurality of BWPs for the terminal device, for example, configure a first BWP and a second BWP for the terminal device. In addition, the network device can further simultaneously activate the first BWP and the second BWP. Alternatively, the network device may configure different BWPs for the terminal device at different moments. For example, the network device configures and activates the first BWP for the terminal device at a first moment, and configures and activates the second BWP for the terminal device at a second moment. The first moment may be before the second moment, or the first moment may be after the second moment.

For example, the network device configures the first BWP and the second BWP for the terminal device. The first BWP is a BWP configured by the network device for the terminal device during initial access of the terminal device (which may be referred to as an initial BWP for short). In this case, the network device may send a master information block (MIB) to the terminal device. After receiving the MIB, the terminal device may determine, based on the MIB, the first BWP configured by the network device for the terminal device. Alternatively, the terminal device may learn, based on predefined information, of the first BWP configured by the network device for the terminal device. For example, the terminal device determines a frequency domain resource of a synchronization signal through blind synchronization signal detection, and then determines a frequency domain resource of the first BWP based on a predefined relationship. If the first BWP is the BWP configured by the network device for the terminal device during the initial access of the terminal device, the first BWP may be activated by default.

The second BWP may be a BWP configured by the network device for the terminal device after the terminal device accesses a network. For example, the network device may send a system information block (SIB) to the terminal device. After receiving the SIB, the terminal device may determine, based on the SIB, the second BWP configured by the network device for the terminal device. Alternatively, the network device may send radio resource control (RRC) signaling to the terminal device. After receiving the RRC signaling, the terminal device may learn, based on the RRC signaling, of the second BWP configured by the network device for the terminal device. Alternatively, the network device may notify, by using other signaling, the second BWP allocated to the terminal device, for example, notify, by using common downlink control information (DCI) or specific DCI of the terminal device, the second BWP configured for the terminal device. Alternatively, the network device may configure the second BWP for the terminal device in a predefined manner, and the terminal device can determine, based on the predefined information, the second BWP configured by the network device for the terminal device. How the network device notifies the configured second BWP is not limited in this embodiment of the present invention. In this case, the network device may activate, by using the common DCI, the specific DCI of the terminal device, or higher layer signaling, the second BWP configured for the terminal device. The higher layer signaling is, for example, the SIB, the RRC signaling, or a media access control (MAC) control element (CE).

It should be noted that BWPs configured by the network device for the terminal device may belong to a same carrier, or may belong to different carriers. Similarly, active BWPs of the terminal device may also belong to a same carrier or belong to different carriers. This is not limited in this embodiment of this application.

For example, the network device activates two BWPs (for example, the first BWP and the second BWP) for the terminal device. There may be a plurality of cases of a relationship between the first BWP and the second BWP. For example, in a case 1, the first BWP and the second BWP do not overlap at all. For this, refer to the first BWP (BWP 1) and the second BWP (BWP 2) in FIG. 1c. In a case 2, the first BWP partially overlaps the second BWP. For this, refer to FIG. 3(a), FIG. 3(b), and FIG. 3(c).

Figure 3A:
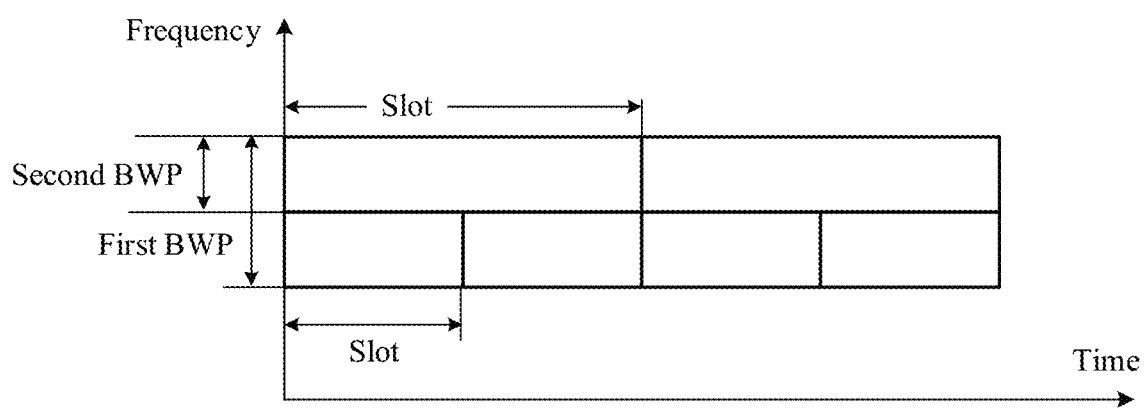
FIG. 3(a), FIG. 3(b) and FIG. 3(c) are schematic diagrams of cases in which a first BWP partially overlaps a second BWP according to an embodiment of this application.
Figure 3B:
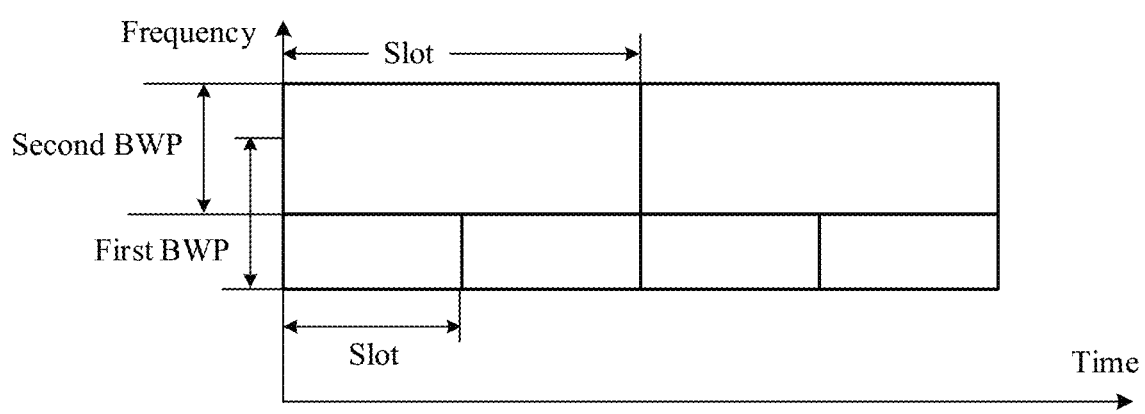
Figure 3C:
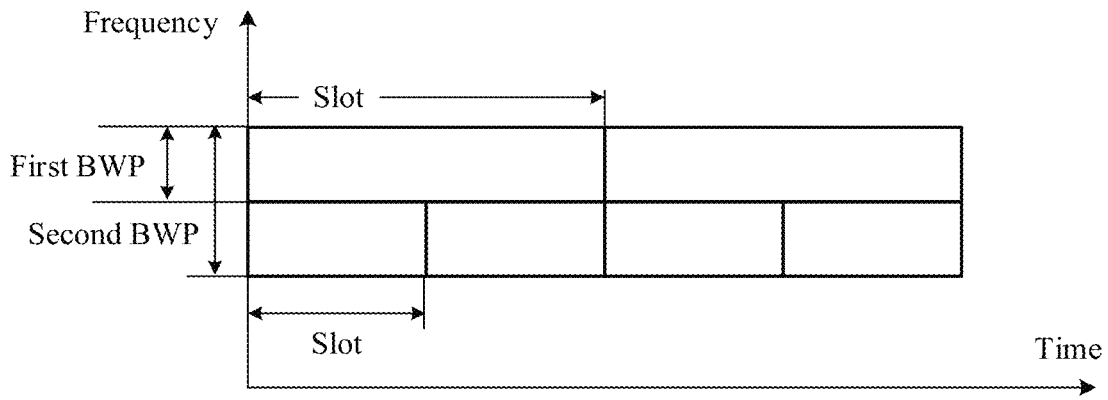

In Embodiment 1, an implementation of transmitting the data channel between the network device and the terminal device when the network device activates the two BWPs for the terminal device (a relationship between the two BWPs is a case shown in FIG. 3(a) or FIG. 3(b)) is mainly described.

Figure 4:
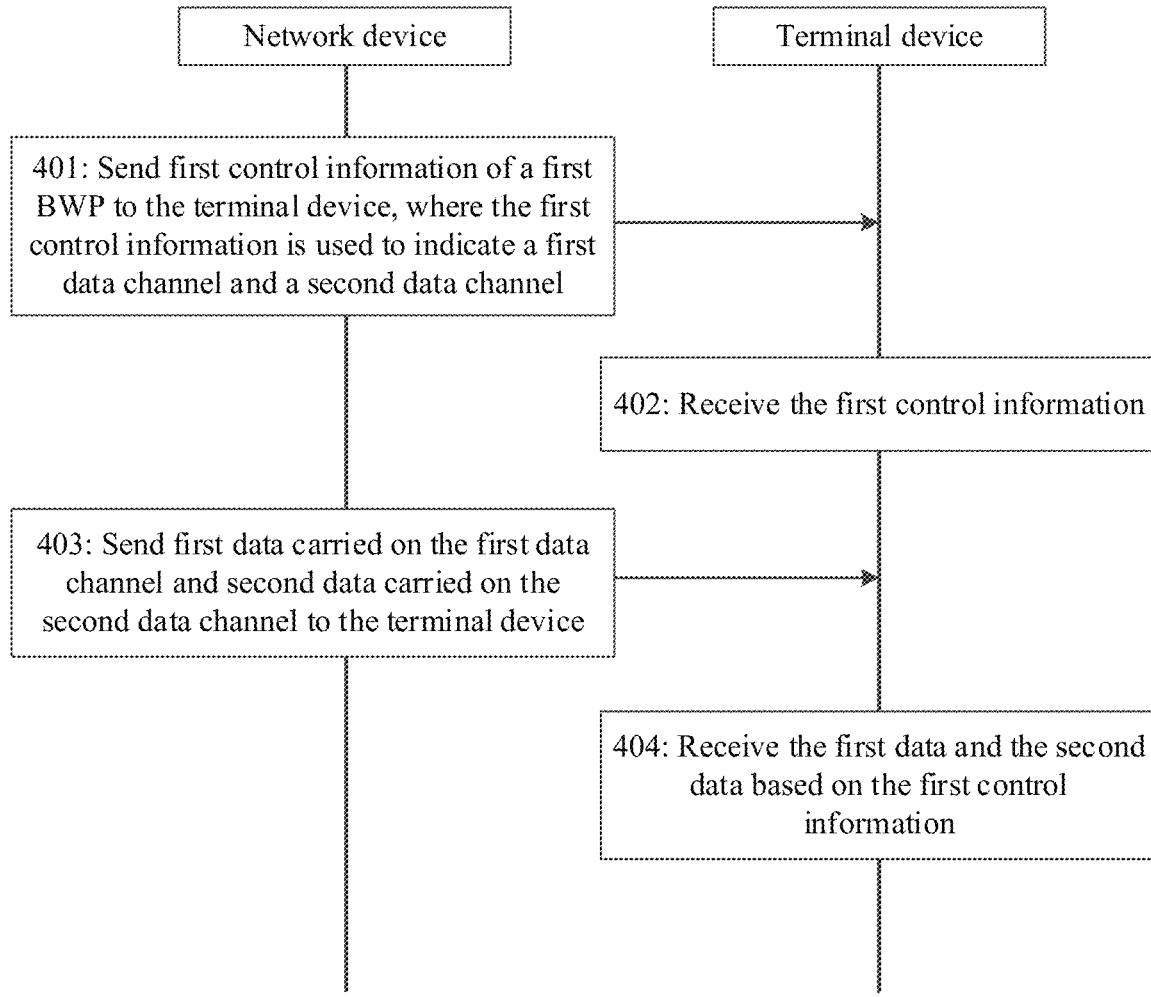
FIG. 4 is a schematic flowchart corresponding to a communication method according to Embodiment 1 of this application.

FIG. 4 is a schematic flowchart corresponding to a communication method according to Embodiment 1 of this application. As shown in FIG. 4, the method includes the following steps.

Step 401: A network device sends first control information of a first BWP to a terminal device, where the first control information is used to indicate a first data channel and a second data channel.

Correspondingly, in step 402, the terminal device receives the first control information.

For example, that the first control information is used to indicate the first data channel and the second data channel may be that the first control information is used to indicate a time-frequency position of the first data channel and a time-frequency position of the second data channel. For example, the first control information is used to indicate the time-frequency position of the first data channel. For example, the first control information may include two fields: a frequency domain resource allocation field and a time domain resource allocation field. Information carried in the frequency domain resource allocation field may indicate a frequency domain position of the first data channel. Information carried in the time domain resource allocation field may indicate a time domain position of the first data channel.

In some embodiments of this application, there may be a plurality of implementations in which the network device sends the first control information to the terminal device. For example, the network device sends the first control information to the terminal device on the first BWP, or the network device may send the first control information to the terminal device on another active BWP. This is not specifically limited.

Step 403: The network device sends, to the terminal device, first data carried on the first data channel and second data carried on the second data channel.

Correspondingly, in step 404, the terminal device receives the first data and the second data based on the first control information.

Figure 5:
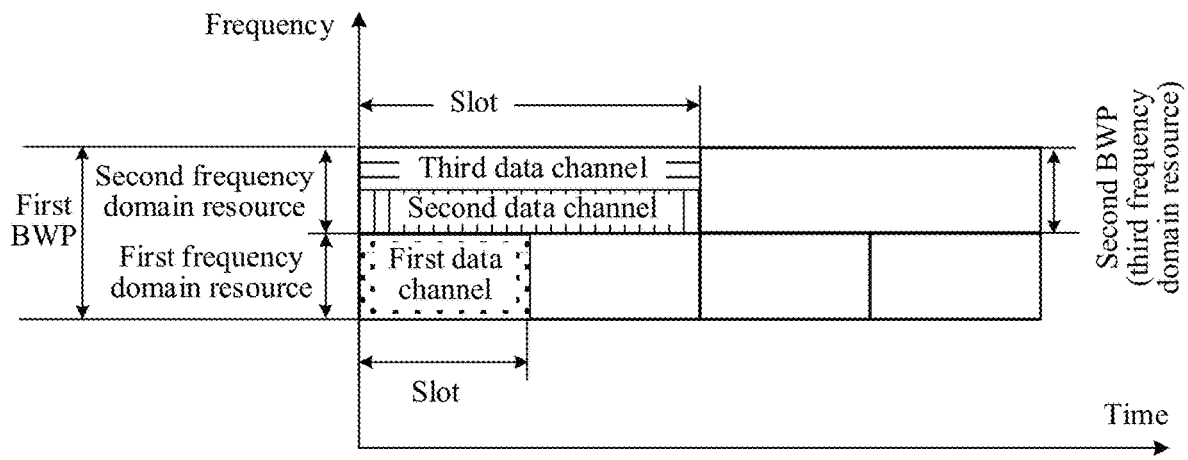
FIG. 5 is a schematic diagram of different data channels according to an embodiment of this application.

The first BWP includes a first frequency domain resource and a second frequency domain resource (it may be understood as that the first BWP includes two segment of frequency domain resources, where one segment of frequency domain resources is referred to as the first frequency domain resource, and the other segment of frequency domain resources is referred to as the second frequency domain resource). The second BWP includes a third frequency domain resource, and the third frequency domain resource, completely or partially, overlaps the second frequency domain resource in frequency domain. In other words, the relationship between the first BWP and the second BWP may be the case shown in FIG. 3(a) or FIG. 3(b). Further, the first data channel may be located on the first frequency domain resource, and the second data channel may be located on the third frequency domain resource. The case shown in FIG. 3(a) is used as an example. FIG. 5 shows positions of the first data channel and the second data channel.

The foregoing method provides a manner of transmitting the data channel on the first BWP and the second BWP when the first BWP and the second BWP that are activated partially overlap. In other words, when data needs to be transmitted on the first BWP, a part of the data may be carried on the first BWP (for example, the first frequency domain resource), and the other part of the data may be carried on the second BWP (for example, the third frequency domain resource). This can improve resource utilization efficiency, and can effectively increase a data transmission success rate.

In an example, the foregoing method further includes: sending, by the network device, second control information of the second BWP to the terminal device, where the second control information is used to indicate a third data channel, for example, the second control information is used to indicate a time-frequency position of the third data channel.

For a specific manner, refer to the foregoing manner in which the first control information indicates the time-frequency position of the first data channel. Details are not described again. Correspondingly, the terminal device may receive, based on the second control information, third data carried on the third data channel.

For example, the network device may send the second control information of the second BWP to the terminal device in a plurality of manners. For example, the network device sends the second control information to the terminal device on the second BWP. Alternatively, the network device may send the second control information to the terminal device on another active BWP (for example, the first BWP). This is not specifically limited.

For example, the third data channel may be located on the third frequency domain resource, and a position of the third data channel does not overlap a position of the second data channel, or the position of the third data channel does not overlap the time-frequency position of the second data channel. In an example, the position of the third data channel does not overlap the time-frequency position of the second data channel. It may be understood as that a time-frequency resource occupied by the third data channel is different from a time-frequency resource occupied by the second data channel (that is, a time domain resource occupied by the third data channel is different from a time domain resource occupied by the second data channel, and/or a frequency domain resource occupied by the third data channel is different from a frequency domain resource occupied by the second data channel), as shown in FIG. 5.

Figure 6A:
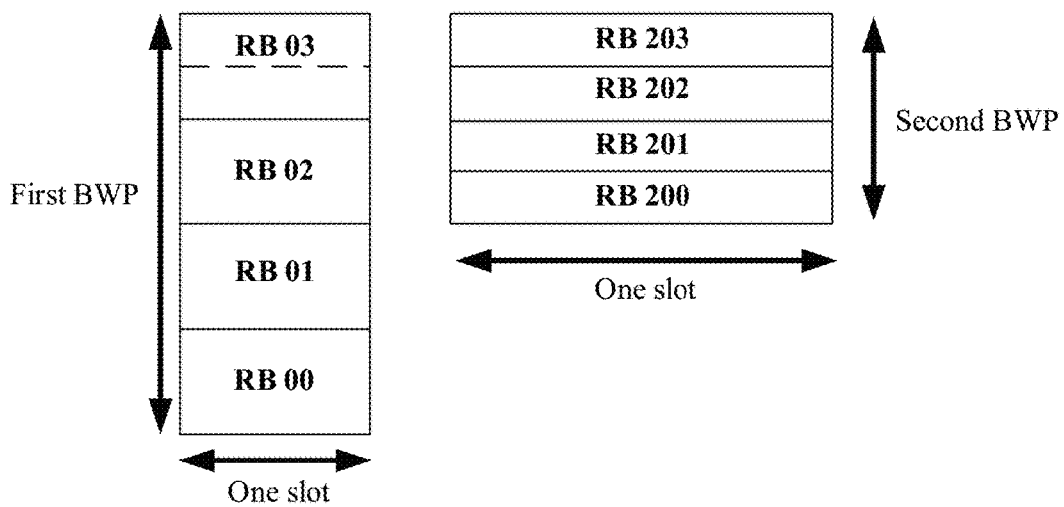
FIG. 6a is a schematic diagram of RBs included in a first BWP and a second BWP according to an embodiment of this application.

The following uses an example for description. Refer to FIG. 6a. A subcarrier spacing of the first BWP is 30 kHz, and a subcarrier spacing of the second BWP is 15 kHz. In one slot, RBs of the first BWP may include an RB 00, an RB 01, an RB 02, and an RB 03. RBs of the second BWP may include an RB 200, an RB 201, an RB 202, and an RB 203. The RB 02 of the first BWP overlaps the RB 200 and the RB 201 of the second BWP in frequency domain. The RB 03 of the first BWP overlaps the RB 202 and the RB 203 of the second BWP in frequency domain.

After the network device performs an operation, such as encoding, on to-be-transmitted raw data, system data and check data may be obtained and inserted into a circular buffer through interleaving (in specific implementation, the system data may be inserted first, and then the check data is inserted). Then, bits are extracted from different start positions of the circular buffer to generate different redundancy versions (RVs), for example, an RVi (i=0, 1, 2, 3, . . . , N), where an RV0 includes at least the system data, and N is an integer greater than 0. If an amount of the to-be-transmitted data (a sum of data amounts from the RV0 to the RVi) is M (for example, M is 19440 bits), the RB 00, the RB 01, and the RB 02 of the first BWP need to be occupied. Because the RB 02 of the first BWP overlaps the RB 200 and the RB 201 of the second BWP in frequency domain, it may be considered that the second BWP carries a part of the data.

For example, the network device may determine an amount of data that can be carried on one RB of the first BWP and an amount of data that can be carried on one RB of the second BWP. For example, the network device learns, based on the subcarrier spacing of the first BWP, a symbol length, and channel quality reported by the terminal, that the amount of the data that can be carried on one RB of the first BWP is N1 (for example, 3240 bits), and learns, based on the subcarrier spacing of the second BWP, the symbol length, and the channel quality reported by the terminal, that the amount of the data that can be carried on one RB of the second BWP is N2 (for example, 3752 bits). In this case, it can be obtained that a quantity W of RBs that need to be used on the second BWP is equal to 1 (W=N1*(a quantity of RBs that need to be used on the first BWP)/N2=3240*1/3752=0.86 rounded up), that is, one RB needs to be used on the second BWP, for example, the RB may be RB 200.

Figure 6B:
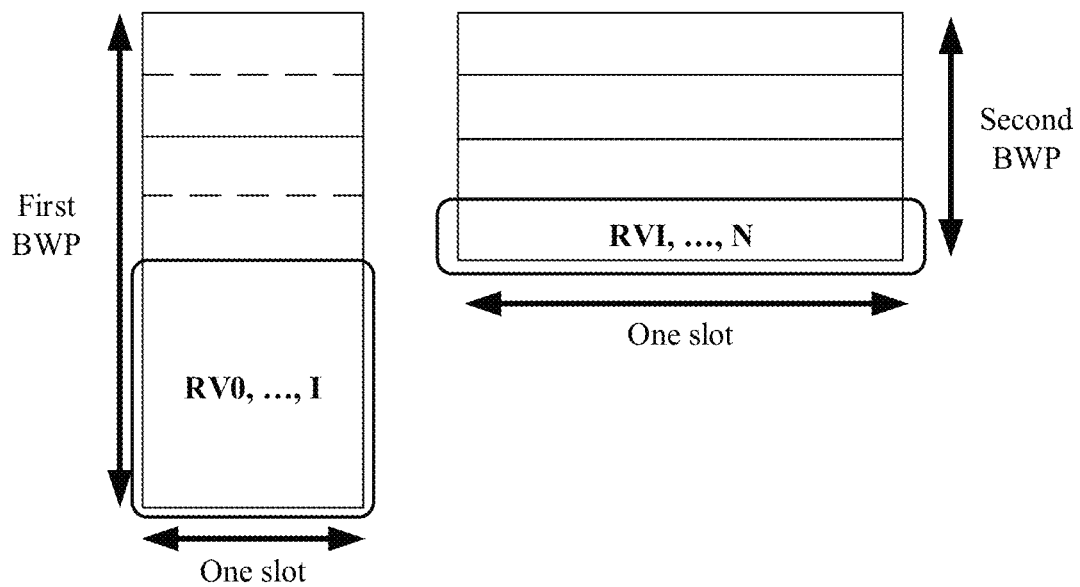
FIG. 6b is a schematic diagram of transmitting first data on a first BWP and transmitting second data on a second BWP according to an embodiment of this application.

Further, refer to FIG. 6b. The network device may map the first data (where the first data may include a first redundancy version, and in an example, the first data includes the RV0 to the RVI, I is an integer greater than or equal to 0 and less than or equal to N−1, and the first redundancy version may be any one of the RV0 to the RVI) to the RB 00 and the RB 01 on the first BWP for sending, and map the second data (where the second data may include a second redundancy version, and in an example, the second data includes an RVI+1 to an RVN, and the second redundancy version may be any one of the RV0 to the RVI) to the RB 200 on the second BWP for sending. It may be understood as that the first data channel occupies the RB 00 and the RB 01, and the second data channel occupies the RB 200.

Correspondingly, after receiving the first data and the second data, the terminal device may first process the first data, and if the processing fails, process the first data and the second data together. The first data is used as an example, where processing the first data may be understood as parsing or demodulating the first data. In other words, the terminal device may not parse the RVI+1 to the RVN if successfully parsing the RV0 to the RVI. The terminal device may parse the RV0 to the RVN if not successfully parsing the RV0 to the RVI. In this manner, because the to-be-transmitted data can be sent through different BWPs, when a redundancy version on a BWP fails to be parsed, the redundancy version on the BWP and a redundancy version on another BWP can be parsed together or jointly parsed. Therefore, a data transmission success rate can be effectively increased.

It should be noted that before mapping the second data to the RB 200 on the second BWP for sending, the network device needs to determine that the third data channel does not occupy the RB 200 (for example, the third data channel occupies the RB 203). That is, time-frequency positions of the third data channel and the second data channel do not overlap, so that resource utilization is improved on the basis of avoiding affecting normal transmission of the third data channel.

Embodiment 2

In Embodiment 2, an implementation of transmitting a downlink control channel between a network device and a terminal device when the network device activates a plurality of BWPs for the terminal device is mainly described.

Figure 7:
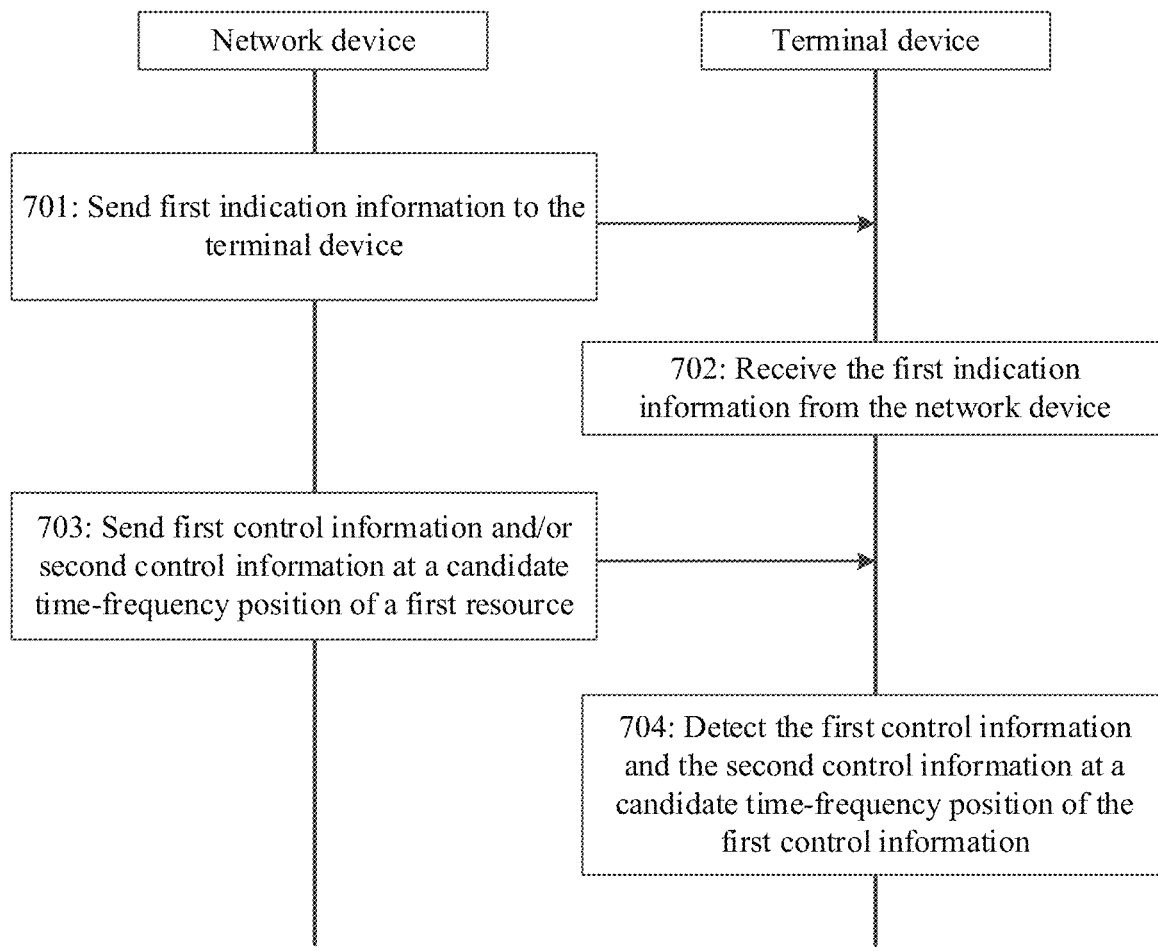
FIG. 7 is a schematic flowchart corresponding to a communication method according to Embodiment 2 of this application.

FIG. 7 is a schematic flowchart corresponding to a communication method according to Embodiment 2 of this application. As shown in FIG. 7, the method includes the following steps.

Step 701: A network device sends first indication information to a terminal device, where the first indication information is used to indicate that a candidate time-frequency position of first control information of a first resource is the same as a candidate time-frequency position of second control information of a second resource.

Step 702: The terminal device receives the first indication information from the network device.

Step 703: The network device sends the first control information of the first resource and/or the second control information of the second resource at the candidate time-frequency position of the first resource.

Step 704: The terminal device detects the first control information and the second control information at the candidate time-frequency position of the first control information.

According to the foregoing method, because candidate time-frequency positions of the first control information and the second control information are the same, the first control information and the second control information can be detected at the candidate time-frequency position of the first control information. That is, the first control information and the second control information can be detected without increasing blind detection power consumption of the first control information.

It should be noted that types of the first resource and the second resource are not limited in this embodiment of this application. For example, the first resource and the second resource may be two different carriers, or the first resource and the second resource may be two different BWPs. For example, the first resource is a first BWP, and the second resource is a second BWP. The first BWP and the second BWP may belong to a same carrier, or may belong to different carriers. This is not limited in this embodiment of this application.

An example in which the first resource is the first BWP and the second resource is the second BWP is used for description below.

For example, before step 701, the network device may send configuration information of a search space of the first BWP to the terminal device. For example, the network device sends a PDCCH configured information element (PDCCH configured IE for short) of the first BWP to the terminal device. The PDCCH configured IE may carry the configuration information of the search space of the first BWP. The configuration information of the search space of the first BWP may include one or more of parameters such as a PDCCH monitoring period, a PDCCH monitoring offset, a PDCCH monitoring mode, and a quantity of consecutive slots that need to be monitored in each PDCCH monitoring period. The PDCCH monitoring period is used to configure a quantity of slots as an interval at which the terminal device performs monitoring once. The PDCCH monitoring offset is used to indicate a specific slot in which the terminal device performs monitoring in a monitoring period. The PDCCH monitoring mode is used to indicate a symbol, in a slot, from which the terminal device starts monitoring. Correspondingly, the terminal device may obtain a candidate time-frequency position of the first BWP based on information carried in the PDCCH configured IE of the first BWP. The candidate time-frequency position of the first BWP may be understood as a time-frequency position that may occur on the PDCCH of the first BWP.

In step 701, the network device sends the first indication information to the terminal device to indicate that there may be a plurality of implementations in which a candidate time-frequency position of the second BWP and the candidate time-frequency position of the first BWP are the same. For example, a BWP activated by the network device for the terminal device includes the first BWP and the second BWP. In a possible implementation (referred to as an implementation 1), the network device may send the PDCCH configured IE of the first BWP to the terminal device and send a PDCCH configured IE of the second BWP to the terminal device. The PDCCH configured IE of the first BWP may include parameters such as the PDCCH monitoring period, the PDCCH monitoring offset, the PDCCH monitoring mode, and the quantity of consecutive slots that need to be monitored in each PDCCH monitoring period, but content carried in the PDCCH configured IE of the second BWP may be empty. In this way, after receiving the PDCCH configured IE of the second BWP, the terminal device can learn that the candidate time-frequency position of the second BWP is the same as the candidate time-frequency position of the active first BWP.

In still another possible implementation (referred to as an implementation 2), the network device may send the PDCCH configured IE of the first BWP to the terminal device and send a PDCCH configured IE of the second BWP to the terminal device, where content carried in the PDCCH configured IE of the second BWP is the same as content carried in the PDCCH configured IE of the first BWP. In this way, after receiving the PDCCH configured IE of the second BWP, the terminal device can learn that the candidate time-frequency position of the second BWP is the same as the candidate time-frequency position of the active first BWP.

It should be noted that: (1) The first indication information may be understood as the PDCCH configured IE of the second BWP in the implementation 1 and the implementation 2. (2) The foregoing description is provided by using an example in which the BWP activated by the network device for the terminal device includes the first BWP and the second BWP. In another possible example, for example, in an example 1, if the BWP activated by the network device for the terminal device further includes a third BWP, information carried in a PDCCH configured IE of the third BWP may be empty, or content carried in the PDCCH configured IE of the third BWP is the same as the content carried in the PDCCH configured IE of the first BWP. Therefore, the terminal device can learn that a candidate time-frequency position of the third BWP is the same as the candidate time-frequency position of the first BWP. In other words, if the network device activates the first BWP and other BWPs for the terminal device, and candidate time-frequency positions of the other BWPs are the same as the candidate time-frequency position of the first BWP, the foregoing implementation or implementation 2 may be used for indication to the terminal device. For another example, in an example 2, the BWP activated by the network device for the terminal device includes the first BWP, the second BWP, the third BWP, and a fourth BWP. If the candidate time-frequency position of the first BWP is the same as the candidate time-frequency position of the second BWP, and the candidate time-frequency position of the third BWP is the same as a candidate time-frequency position of the fourth BWP, the implementation 2 can be used for indication to the terminal device that the content carried in the PDCCH configured IE of the second BWP is the same as the content carried in the PDCCH configured IE of the first BWP, and content carried in a PDCCH configured IE of the fourth BWP is the same as the content carried in the PDCCH configured IE of the third BWP.

In some embodiments of this application, the first control information and the second control information are used to indicate different data channels. For example, the first control information may be used to indicate a data channel 1, and the second control information may be used to indicate a data channel 2. For example, the first control information may be used to indicate a time-frequency position of the data channel 1, and the second control information may be used to indicate a time-frequency position of the data channel 2. The first control information is used as an example. The first control information may include two fields: a frequency domain resource allocation field and a time domain resource allocation field. The frequency domain resource allocation field is used to indicate a frequency domain position of the data channel 1. The time domain resource allocation field is used to indicate a time domain position of the data channel 1. If the frequency domain position of the data channel 1 is located on the first BWP, and a frequency domain position of the data channel 2 is located on the second BWP, because an original payload size of control information of a BWP is determined by configuration information of the BWP, that the configuration information of the first BWP (for example, a frame structure parameter of the first BWP may be included) is different from the configuration information of the second BWP causes an original payload size (payload size) of the first control information to be different from an original payload size of the second control information. For example, a size of the frequency domain resource allocation field in the first control information may be different from a size of the frequency domain resource allocation field in the second control information, and a size of the time domain resource allocation field in the first control information may be different from a size of the time domain resource allocation field in the second control information.

Therefore, in step 703, the network device may determine a target payload size based on the configuration information of the first BWP and the configuration information of the second BWP. In other words, the network device may determine the target payload size based on the original payload size of the first control information and the original payload size of the second control information. Further, if the original payload size of the first control information is less than the target payload size, the network device may perform a zero padding operation on control information of the first BWP, to enable the payload size of the control information of the first BWP to be equal to the target payload size, and send the control information of the first BWP. If an original payload size of control information of the second BWP is less than the target payload size, the network device may perform the zero padding operation on the control information of the second BWP, to enable the payload size of the control information of the second BWP to be equal to the target payload size, and send the control information of the second BWP.

For example, if the original payload size of the first control information is K1, the original payload size of the second control information is K2, and K2<K1, the network device may determine that the target payload size is K2. In an example, when sending the second control information, the network device may first perform the zero padding operation on the frequency domain resource allocation field and/or the time domain resource allocation field in the second control information, and then perform the zero padding operation on a tail of the second control information, so that a payload size of the second control information is equal to K1. It may be understood that, if the payload size of the second control information is equal to K1 after the zero padding operation is performed on the frequency domain resource allocation field and/or the time domain resource allocation field in the second control information, the zero padding operation may not be performed on the tail of the second control information. In still another example, when sending the second control information, the network device may directly perform the zero padding operation on the tail of the second control information, where a zero padding length is K1−K2+1, so that the payload size of the second control information is equal to K1.

In some embodiments of this application, the first control information may further include second indication information, the second indication information is used to indicate the first BWP, the second control information may further include third indication information, and the third indication information is used to indicate the second BWP.

In step 704, within a PDCCH monitoring period, the terminal device may start to attempt decoding from a first candidate time-frequency position of the first BWP. If a cyclic redundancy check (cyclic redundancy check, CRC) succeeds, the terminal device may determine, based on the second indication information or the third indication information carried in the control information, whether the control information is the first control information of the first BWP or the second control information of the second BWP, and may determine the time-frequency position of the data channel based on information carried in the frequency domain resource allocation field and the time domain resource allocation field in the control information.

For example, there are a total of 20 candidate time-frequency positions in one PDCCH monitoring period. The terminal device starts to attempt decoding from the first candidate time-frequency position. If the decoding succeeds at the tenth position to obtain the first control information, decoding may continue to be attempted from the eleventh position until the decoding succeeds to obtain the second control information. For example, if decoding succeeds at the fifteenth position to obtain the second control information, remaining five candidate time-frequency positions may not be decoded.

It should be noted that, in an optional embodiment, the first indication information sent by the network device to the terminal device may be valid in a period of time, and the period of time may be determined by negotiation between the network device and the terminal device, or may be predefined in a protocol. Alternatively, the first indication information may remain valid until the first resource and/or the second resource are/is deactivated. This is not specifically limited.

In an example, the period of time may include durations of a plurality of PDCCH monitoring periods. For example, a duration of the PDCCH monitoring period is one slot, and the period of time includes two slots (respectively a slot k and a slot k+1). From a perspective of the network device, the network device may send the first control information and the second control information in the slot k, and send the first control information but not send the second control information in the slot k+1. From a perspective of the terminal device, because the terminal device cannot learn whether the network device simultaneously sends the first control information and the second control information in a slot, after receiving the first indication information, the terminal device may detect the first control information and the second control information in both the slot k and the slot k+1.

In still another example, the period of time may be a duration of one PDCCH monitoring period, for example, each is a slot. In this case, from a perspective of the network device, the network device may send the first control information and the second control information in the slot. From a perspective of the terminal device, the terminal device may detect the first control information and the second control information in the slot.

According to the method described in Embodiment 2, the network device may send control information of a plurality of other resources at candidate time-frequency positions of one or more resources, to effectively reduce power consumption of blindly detecting the control information by the terminal device.

For Embodiment 1 and Embodiment 2, it should be noted that: (1) Step numbers in the embodiments of this application are merely a possible example of an execution procedure, and do not constitute a limitation on an execution sequence of the steps. In the embodiments of this application, there is no strict execution sequence between steps that have no time sequence dependency relationship with each other.

(2) The first control information and the second control information in the embodiments of this application may be DCI or an information field in the DCI. The first data channel, the second data channel, and the third data channel may be PDSCHs.

(3) Embodiment 1 focuses on the description of implementation of transmitting a data channel, and Embodiment 2 focuses on the description of implementation of transmitting a control channel. For other content except this difference, Embodiment 1 and Embodiment 2 may refer to each other.

(4) Embodiment 1 and Embodiment 2 may be separately implemented, or may be implemented in combination, which is not specifically limited. When Embodiment 1 and Embodiment 2 are jointly implemented, the network device and the terminal device in Embodiment 1 may transmit the first control information and the second control information in the manner in Embodiment 2. That is, the network device may send the first control information and the second control information at the candidate time-frequency position of the first control information.

The foregoing mainly describes, from the perspective of interaction between the network device and the terminal device, the solutions provided in the embodiments of this application. It may be understood that, to implement the foregoing functions, the network device or the terminal device may include corresponding hardware structures and/or software modules for performing the functions. A person skilled in the art should be easily aware that, in combination with units and algorithm steps of the examples described in the embodiments disclosed in this specification, the embodiments of this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 8:
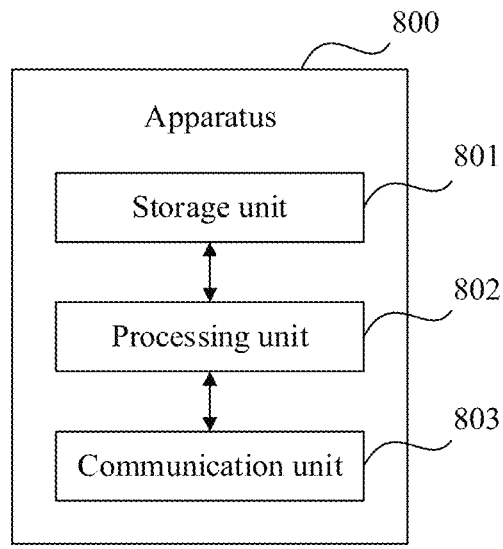
FIG. 8 is a possible example block diagram of an apparatus according to an embodiment of this application.

When an integrated unit (module) is used, FIG. 8 is a possible example block diagram of an apparatus according to an embodiment of this application. The apparatus 800 may exist in a form of software. The apparatus 800 may include a processing unit 802 and a communication unit 803. The processing unit 802 is configured to control and manage an action of the apparatus 800. The communication unit 803 is configured to support the apparatus 800 in communicating with another network entity. Optionally, the communication unit 803 is also referred to as a transceiver unit, and may include a receiving unit and/or a sending unit, which are respectively configured to perform a receiving operation and a sending operation. The apparatus 800 may further include a storage unit 801, configured to store program code and/or data of the apparatus 800.

The processing unit 802 may be a processor or a controller, and may implement or execute various example logical blocks, modules, and circuits described with reference to content disclosed in the embodiments of this application. The communication unit 803 may be a communication interface, a transceiver, a transceiver circuit, or the like. The communication interface is a general name, and may include a plurality of interfaces during specific implementation. The storage unit 801 may be a memory.

The apparatus 800 may be the terminal device in any one of the foregoing embodiments, or may be a semiconductor chip disposed in the terminal device. The processing unit 802 may support the apparatus 800 in performing actions of the terminal device in the foregoing method examples. Alternatively, the processing unit 802 mainly performs an internal action of the terminal in the method examples, and the communication unit 803 may support communication between the apparatus 800 and the network device. For example, the communication unit 803 is configured to perform step 402 and step 404 in FIG. 4, and step 702 and step 704 in FIG. 7.

Specifically, in an embodiment, the communication unit is configured to: receive first control information of a first BWP from the network device, where the first control information is used to indicate a first data channel and a second data channel; and receive, from the network device based on the first control information, first data carried on the first data channel and second data carried on the second data channel. The first BWP includes a first frequency domain resource and a second frequency domain resource, a second BWP includes a third frequency domain resource, and the third frequency domain resource and the second frequency domain resource overlap in frequency domain. The third frequency domain resource and the second frequency domain resource may overlap partially or completely. The first data channel is located on the first frequency domain resource, and the second data channel is located on the third frequency domain resource.

In a possible design, the first data includes a first redundancy version obtained based on to-be-transmitted data, and the second data includes a second redundancy version obtained based on the to-be-transmitted data.

In a possible design, the processing unit is configured to: process the first data, and if the processing fails, process the first data and the second data.

In a possible design, the communication unit is further configured to: receive second control information of the second BWP from the network device, where the second control information is used to indicate a third data channel; and receive, from the network device based on the second control information, third data carried on the third data channel. The third data channel is located on the third frequency domain resource, and a position of the third data channel does not overlap a position of the second data channel.

In a possible design, the communication unit is further configured to: receive indication information from the network device, where the indication information is used to indicate that a candidate time-frequency position of the first control information is the same as a candidate time-frequency position of the second control information of the second BWP; and receive the first control information and the second control information at the candidate time-frequency position of the first control information.

In a possible design, the communication unit is further configured to receive a configuration parameter of a search space of the first BWP from the network device. The processing unit is further configured to determine the candidate time-frequency position of the first control information based on the configuration parameter of the search space of the first BWP.

In a possible design, a payload size of the first control information is equal to a payload size of the second control information.

The apparatus 800 may be the network device in any one of the foregoing embodiments, or may be a semiconductor chip disposed in the network device. The processing unit 802 may support the apparatus 800 in performing actions of the network device in the foregoing method examples. Alternatively, the processing unit 802 mainly performs an internal network action in the method examples, and the communication unit 803 may support communication between the apparatus 800 and the terminal device. For example, the communication unit 803 is configured to perform step 401 and step 403 in FIG. 4, and step 701 and step 703 in FIG. 7.

Specifically, in an embodiment, the communication unit is configured to send first control information of a first BWP to the terminal device, where the first control information is used to indicate a first data channel and a second data channel; and send, to the terminal device, first data carried on the first data channel and second data carried on the second data channel. The first BWP includes a first frequency domain resource and a second frequency domain resource. A second BWP includes a third frequency domain resource, and the third frequency domain resource and the second frequency domain resource overlap in frequency domain. The third frequency domain resource and the second frequency domain resource may overlap completely in frequency domain in some embodiments. The first data channel is located on the first frequency domain resource, and the second data channel is located on the third frequency domain resource.

In a possible design, the first data includes a first redundancy version obtained based on to-be-transmitted data, and the second data includes a second redundancy version obtained based on the to-be-transmitted data.

In a possible design, the communication unit is further configured to send second control information of the second BWP to the terminal device, where the second control information is used to indicate a third data channel. The third data channel is located on the third frequency domain resource, and a position of the third data channel does not overlap a position of the second data channel.

In a possible design, the communication unit is further configured to: send indication information to the terminal device, where the indication information is used to indicate that a candidate time-frequency position of the first control information is the same as a candidate time-frequency position of the second control information of the second BWP; and send the first control information and/or the second control information at the candidate time-frequency position of the first control information.

In a possible design, the communication unit is further configured to send a configuration parameter of a search space of the first BWP to the terminal device.

In a possible design, a payload size of the first control information is equal to a payload size of the second control information.

Figure 9:
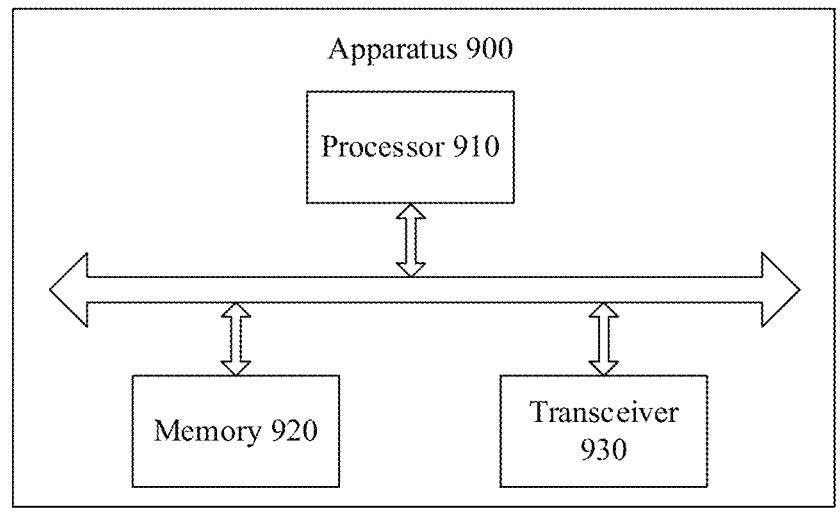
FIG. 9 is a schematic structural diagram of an apparatus according to an embodiment of this application.

FIG. 9 is a schematic structural diagram of an apparatus. The apparatus 900 includes a processor 910, a memory 920, and a transceiver 930. In an example, the apparatus 900 may implement a function of the apparatus 800 shown in FIG. 8. Specifically, a function of the communication unit 803 shown in FIG. 8 may be implemented by the transceiver, a function of the processing unit 802 may be implemented by the processor, and a function of the storage unit 801 may be implemented by the memory. In still another example, the apparatus 900 may be the network device in the method embodiments, or may be the terminal device in the foregoing method embodiments. The apparatus 900 may be configured to implement the method that corresponds to the network device or the terminal device and that is described in the foregoing method embodiments. For details, refer to the descriptions in the foregoing method embodiments.

Figure 10:
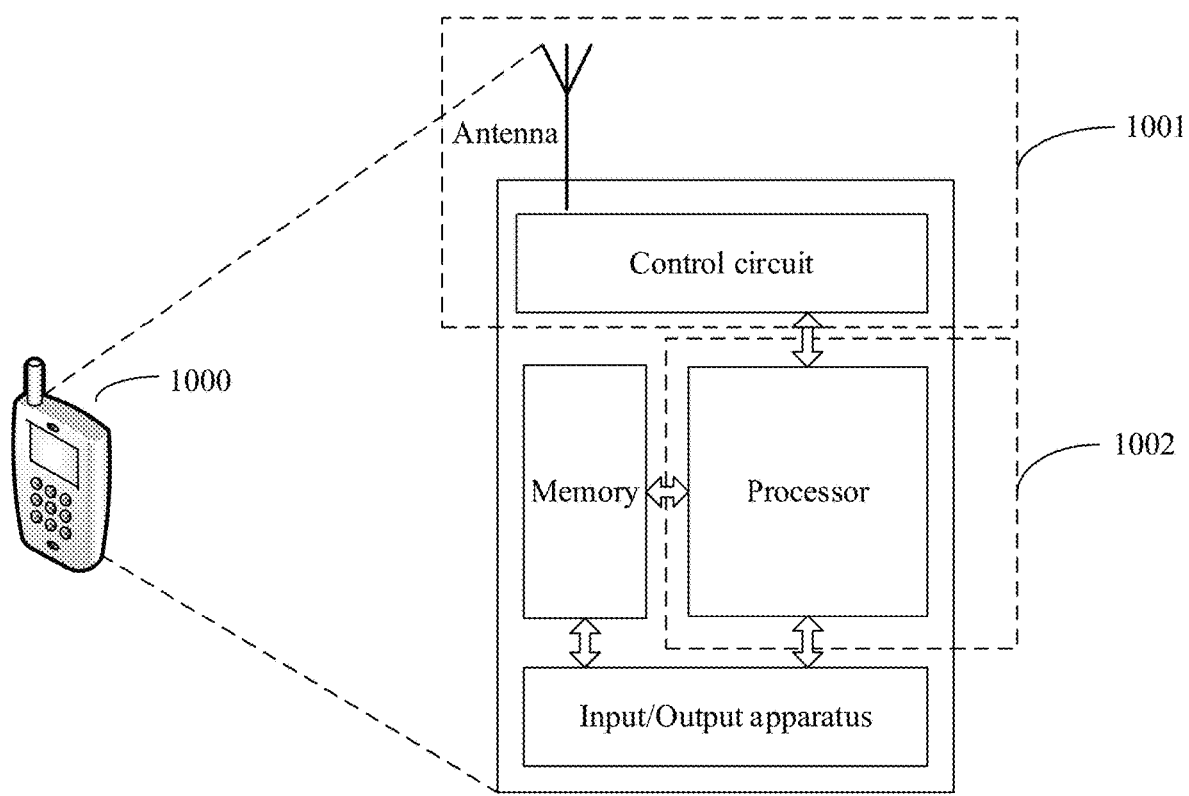
FIG. 10 is a schematic structural diagram of a terminal device according to an embodiment of this application.

FIG. 10 is a schematic structural diagram of a terminal device 1000 according to an embodiment of this application. For ease of description, FIG. 10 shows only main components of the terminal device. As shown in FIG. 10, the terminal device 1000 includes a processor, a memory, a control circuit, an antenna, and an input/output apparatus. The terminal device 1000 may be used in the system architecture shown in FIG. 2, and perform the functions of the terminal device in the foregoing method embodiments.

The processor is mainly configured to process a communication protocol and communication data, control the entire terminal device, execute a software program, and process data of the software program, for example, configured to control the terminal device to perform the actions described in the foregoing method embodiments. The memory is mainly configured to store the software program and the data. The control circuit is mainly configured to perform conversion between a baseband signal and a radio frequency signal, and process the radio frequency signal. A combination of the control circuit and the antenna may also be referred to as a transceiver that is mainly configured to send and receive a radio frequency signal in an electromagnetic wave form. The input/output apparatus, for example, a touchscreen, a display screen, or a keyboard, is mainly configured to: receive data entered by a user, and output data to the user.

After the terminal device is powered on, the processor may read a software program in a storage unit, explain and execute instructions of the software program, and process data of the software program. When data needs to be sent in a wireless manner, after performing baseband processing on to-be-sent data, the processor outputs a baseband signal to a radio frequency circuit. After performing radio frequency processing on the baseband signal, the radio frequency circuit sends a radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 10 shows only one memory and one processor. An actual terminal device may include a plurality of processors and a plurality of memories. The memory may also be referred to as a storage medium, a storage device, or the like. This is not limited in the embodiments of this application.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 10 integrates functions of the baseband processor and the central processing unit. A person skilled in the art may understand that the baseband processor and the central processing unit may be independent processors, and are interconnected by using technologies such as a bus. A person skilled in the art may understand that the terminal device may include a plurality of baseband processors to adapt to different network standards, the terminal device may include a plurality of central processing units to enhance a processing capability of the terminal device, and components of the terminal device may be connected through various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in the storage unit in a form of a software program, so that the processor executes the software program to implement a baseband processing function.

For example, if the apparatus 800 shown in FIG. 8 is a terminal device, in the embodiment of FIG. 10, an antenna having a transceiver function and a control circuit may be considered as a communication unit of the apparatus 800, and a processor having a processing function may be considered as a processing unit of the apparatus 800. For example, the communication unit may include a receiving unit and a sending unit. The receiving unit may also be referred to as a receiver, a receiver, a receiving circuit, or the like. The sending unit may be referred to as a transmitter, a transmitter, a transmitting circuit, or the like.

The terminal device 1000 shown in FIG. 10 can implement processes related to the terminal device in the method embodiment in FIG. 4 or FIG. 7. The operations and/or the functions of the modules in the terminal device 1000 are intended to implement corresponding procedures in the foregoing method embodiments. For details, refer to the descriptions in the foregoing method embodiments. To avoid repetition, detailed descriptions are properly omitted herein.

Figure 11:
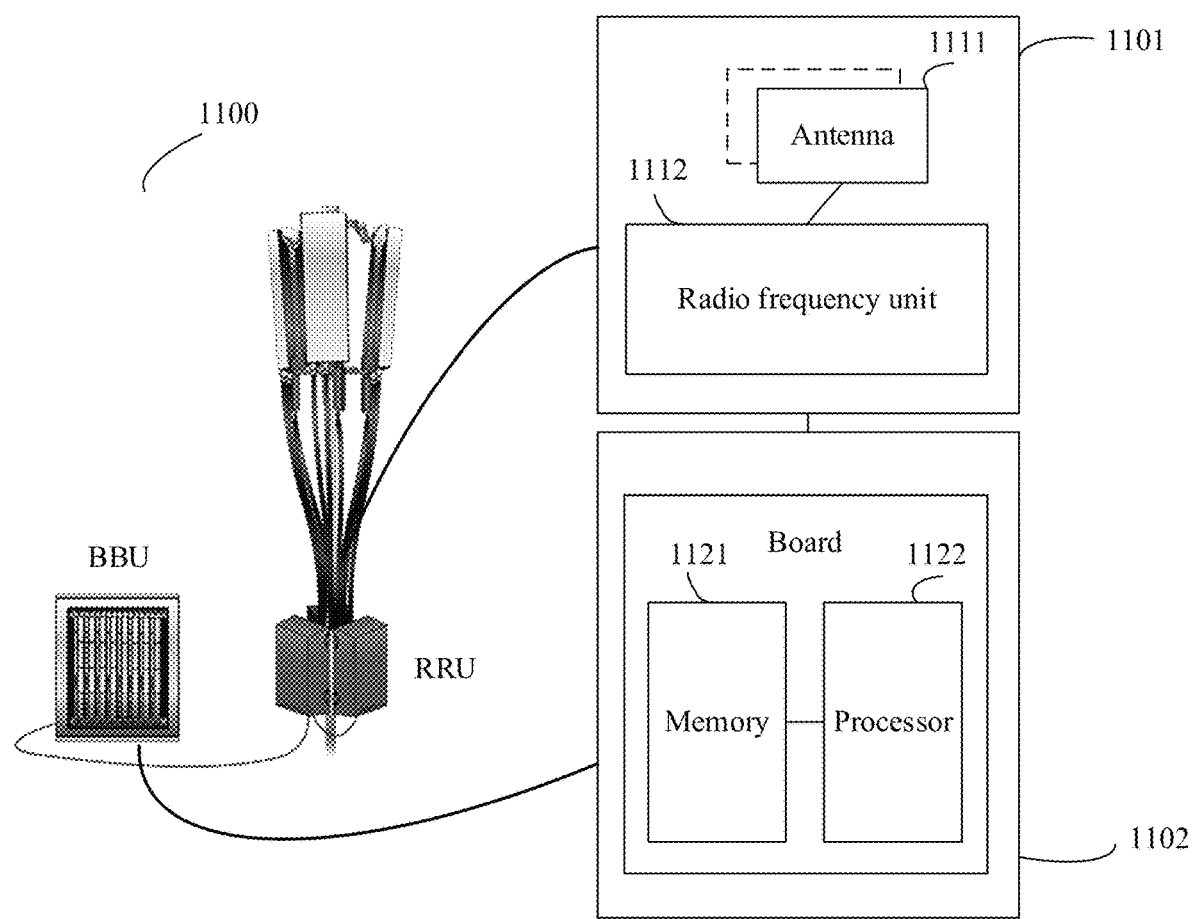
FIG. 11 is a schematic structural diagram of a network device according to an embodiment of this application.

FIG. 11 is a schematic structural diagram of a network device according to an embodiment of this application, for example, may be a schematic structural diagram of a base station. As shown in FIG. 11, the network device 1100 may be used in the system architecture shown in FIG. 2, and perform functions of the network device in the foregoing method embodiments.

The network device 1100 may include one or more radio frequency units, such as a remote radio frequency unit (RRU) 1101 and one or more baseband units (BBU) 1102 (also referred to as digital units (DU)).

The RRU 1101 may be referred to as a transceiver unit, a transceiver, a transceiver circuit, a transceiver, or the like, and may include at least one antenna 1111 and a radio frequency unit 1112. The RRU 1101 is mainly configured to send and receive a radio frequency signal and convert a radio frequency signal and a baseband signal, for example, configured to send the control information in the foregoing method embodiments. The RRU 1101 and the BBU 1102 may be physically disposed together, or may be physically disposed separately, that is, a distributed base station.

The BBU 1102 is a control center of the base station, may also be referred to as a processing unit, and is mainly configured to complete a baseband processing function, for example, channel coding, multiplexing, modulation, or spreading. For example, the BBU (processing unit) 1102 may be configured to control the base station to perform an operation procedure related to the network device in the foregoing method embodiments.

In an embodiment, the BBU 1102 may include one or more boards. A plurality of boards may jointly support a radio access network (for example, an LTE network) of a single access standard, or may separately support radio access networks of different access standards (for example, an LTE network, a 5G network, or another network). The BBU 1102 further includes a memory 1121 and a processor 1122. The memory 1121 is configured to store necessary instructions and data. The processor 1122 is configured to control the base station to perform a necessary action, for example, configured to control the base station to perform an operation procedure related to the network device in the foregoing method embodiments. The memory 1121 and the processor 1122 may serve one or more boards. In other words, a memory and a processor may be separately disposed on each board. Alternatively, a plurality of boards may share a same memory and a same processor. In addition, a necessary circuit may be further disposed on each board.

It should be understood that the network device 1100 shown in FIG. 11 can implement processes related to the network device in FIG. 4 or FIG. 7. The operations and/or the functions of the modules in the network device 1100 are intended to implement corresponding procedures in the foregoing method embodiments. For details, refer to the descriptions in the foregoing method embodiments. To avoid repetition, detailed descriptions are properly omitted herein.

In an implementation process, the steps of the methods in the embodiments may be performed by using a hardware integrated logical circuit in the processor, or by using instructions in a form of software. The steps of the methods disclosed with reference to the embodiments of this application may be directly performed and completed by using a hardware processor, or may be performed and completed by using a combination of hardware in the processor and a software module.

It should be noted that, the processor in the embodiments of this application may be an integrated circuit chip, and has a signal processing capability. In an implementation process, the steps in the foregoing method embodiments may be implemented by using a hardware integrated logic circuit in the processor, or by using instructions in a form of software. The processor may be a general-purpose central processing unit (CPU), a general-purpose processor, digital signal processor (DSP), an application-specific integrated circuit (ASIC), a field programmable gate array (FPGA), another programmable logic device, a transistor logic device, a hardware component, or any combination thereof; or may be a combination of processors implementing a computing function, for example, a combination of one or more microprocessors or a combination of a DSP and a microprocessor. The general-purpose processor may be a microprocessor, or the processor may be any conventional processor or the like.

It may be understood that the memory or storage unit in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through examples but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memories in the systems and the methods described in this specification include but are not limited to these memories and any memory of another suitable type.

All or some of the foregoing embodiments may be implemented by software, hardware, firmware, or any combination thereof. When software is used to implement the embodiments, all or some of the embodiments may be implemented in a form of a computer program product. The computer program product includes one or more computer programs or instructions. When the computer programs or the instructions are loaded and executed on a computer, all or some of procedures or functions in the embodiments of this application are performed. The computer may be a general-purpose computer, a dedicated computer, a computer network, or other programmable apparatuses. The computer programs or instructions may be stored in a computer-readable storage medium, or may be transmitted via the computer-readable storage medium. The computer-readable storage medium may be any usable medium accessible by a computer, or a data storage device, such as a server integrating one or more usable media. The usable medium may be a magnetic medium, for example, a floppy disk, a hard disk, or a magnetic tape; or may be an optical medium, for example, a DVD; or may be a semiconductor medium, for example, a solid-state drive (SSD).

The various illustrative logical units and circuits described in the embodiments of this application may implement or operate the described functions through a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may be connected to the processor, so that the processor can read information from the storage medium and write information into the storage medium. Optionally, the storage medium may alternatively be integrated into the processor. The processor and the storage medium may be arranged in the ASIC, and the ASIC may be arranged in a terminal device. Optionally, the processor and the storage medium may alternatively be arranged in different components of the terminal device.

These computer program instructions may alternatively be loaded onto a computer or another programmable data processing device, so that a series of operations and steps are performed on the computer or the other programmable device, to generate computer-implemented processing. Therefore, the instructions executed on the computer or the another programmable device provide steps for implementing a specified function in one or more processes in the flowcharts and/or in one or more blocks in the block diagrams.

Although the embodiments of this application are described with reference to specific features, it is clear that various modifications and combinations may be made to them without departing from the spirit and scope of the embodiments of this application. Correspondingly, the specification and accompanying drawings are merely example descriptions of the embodiments of this application that are defined by the appended claims, and are considered to cover any or all of modifications, variations, combinations, or equivalents in the scope of the embodiments of this application.

What is claimed is:

1. A communication method, wherein the method comprises:
   receiving first control information of a first bandwidth part (BWP) from a network device, wherein the first control information indicates a first data channel and a second data channel;
   receiving second control information of a second BWP from the network device, wherein the second control information indicates a third data channel;
   receiving, from the network device based on the first control information, first data carried on the first data channel and second data carried on the second data channel, wherein the first BWP comprises a first frequency domain resource and a second frequency domain resource, the second BWP comprises a third frequency domain resource, and the third frequency domain resource and the second frequency domain resource overlap in frequency domain; and the first data channel is located on the first frequency domain resource, and the second data channel is located on the third frequency domain resource;
   receiving indication information from the network device, wherein the indication information is used to indicate that a candidate time-frequency position of the first control information is the same as a candidate time-frequency position of the second control information of the second BWP; and
   receiving the first control information and the second control information at the candidate time-frequency position of the first control information.

2. The method according to claim 1, wherein the first data comprises a first redundancy version obtained based on to-be-transmitted data, and the second data comprises a second redundancy version obtained based on the to-be-transmitted data.

3. The method according to claim 2, wherein the method further comprises: processing the first data, or processing the first data and the second data.

4. The method according to claim 1, wherein the method further comprises: receiving, from the network device based on the second control information, third data carried on the third data channel, wherein the third data channel is located on the third frequency domain resource, and a position of the third data channel is separate from a position of the second data channel.

5. A communication method, wherein the method comprises:
   sending first control information of a first BWP to a terminal device, wherein the first control information indicates a first data channel and a second data channel;
   sending second control information of a second BWP to the terminal device, wherein the second control information is used to indicate a third data channel;
   sending first data carried on the first data channel and second data carried on the second data channel to the terminal device, wherein the first BWP comprises a first frequency domain resource and a second frequency domain resource, the second BWP comprises a third frequency domain resource, and the third frequency domain resource overlaps the second frequency domain resource in frequency domain; and the first data channel is located on the first frequency domain resource, and the second data channel is located on the third frequency domain resource;
   sending indication information to the terminal device, wherein the indication information indicates that a candidate time-frequency position of the first control information is the same as a candidate time-frequency position of the second control information of the second BWP; and
   sending the first control information or the second control information at the candidate time-frequency position of the first control information.

6. The method according to claim 5, wherein the first data comprises a first redundancy version obtained based on to-be-transmitted data, and the second data comprises a second redundancy version obtained based on the to-be-transmitted data.

7. The method according to claim 5, wherein the third data channel is located on the third frequency domain resource, and a position of the third data channel does not overlap a position of the second data channel.

8. The method according to claim 5 wherein the method further comprises:
   sending a configuration parameter of a search space of the first BWP to the terminal device.

9. An apparatus comprising a receiver configured to;
   receive first control information of a first bandwidth part (BWP) from a network device, wherein the first control information indicates a first data channel and a second data channel;
   receive second control information of a second BWP from the network device, wherein the second control information is used to indicate a third data channel;
   receive from the network device based on the first control information, first data carried on the first data channel and second data carried on the second data channel, wherein the first BWP comprises a first frequency domain resource and a second frequency domain resource, the second BWP comprises a third frequency domain resource, and the third frequency domain resource and the second frequency domain resource overlap in frequency domain; and the first data channel is located on the first frequency domain resource, and the second data channel is located on the third frequency domain resource;
   receive indication information from the network device, wherein the indication information indicates that a candidate time-frequency position of the first control information is the same as a candidate time-frequency position of the second control information of the second BWP; and receive the first control information and the second control information at the candidate time-frequency position of the first control information.

10. The apparatus according to claim 9, wherein the first data comprises a first redundancy version obtained based on to-be-transmitted data, and the second data comprises a second redundancy version obtained based on the to be transmitted data.

11. The apparatus according to claim 10, further comprising:
a processor configured to process the first data, wherein if the processing fails, processing the first data and the second data.

12. The apparatus according to claim 9, wherein the receiver is further configured to: receive from the network device based on the second control information, third data carried on the third data channel, wherein the third data channel is located on the third frequency domain resource, and a position of the third data channel is separate from a position of the second data channel.

13. An apparatus comprising a transmitter configured to;
send first control information of a first BWP to a terminal device, wherein the first control information is used to indicate a first data channel and a second data channel;
send second control information of a second BWP to the terminal device, wherein the second control information indicates a third data channel;
send first data carried on the first data channel and second data carried on the second data channel to the terminal device, wherein the first BWP comprises a first frequency domain resource and a second frequency domain resource, the second BWP comprises a third frequency domain resource, and the third frequency domain resource overlaps the second frequency domain resource in frequency domain; and the first data channel is located on the first frequency domain resource, and the second data channel is located on the third frequency domain resource;
send indication information to the terminal device, wherein the indication information indicates that a candidate time-frequency position of the first control information is the same as a candidate time-frequency position of the second control information of the second BWP; and
send the first control information or the second control information at the candidate time-frequency position of the first control information.

14. The apparatus according to claim 13, wherein the first data comprises a first redundancy version obtained based on to-be-transmitted data, and the second data comprises a second redundancy version obtained based on the to-be-transmitted data.

15. The apparatus according to claim 13, wherein the third data channel is located on the third frequency domain resource, and a position of the third data channel is separate from a position of the second data channel.

16. The apparatus according to claim 13, wherein the transmitter is further configured to send a configuration parameter of a search space of the first BWP to the terminal device.

* * * * *

UNITED STATES PATENT AND TRADEMARK OFFICE
CERTIFICATE OF CORRECTION

| | | |
|---|---|---|
| PATENT NO. | : 12,075,435 B2 | |
| APPLICATION NO. | : 17/505907 | |
| DATED | : August 27, 2024 | |
| INVENTOR(S) | : Zhe Liu et al. | |

It is certified that error appears in the above-identified patent and that said Letters Patent is hereby corrected as shown below:

In the Claims

In Column 26, Line 38, in Claim 8, delete "5" and insert -- 5, --.

In Column 27, Lines 7-8, in Claim 10, delete "to be transmitted" and insert -- to-be-transmitted --.

Signed and Sealed this
Twenty-ninth Day of October, 2024

Katherine Kelly Vidal
*Director of the United States Patent and Trademark Office*